July 26, 1966 C. ORR, JR., ET AL 3,262,319
METHOD AND APPARATUS FOR OBTAINING DATA FOR DETERMINING
SURFACE AREA AND PORE VOLUME
Filed May 10, 1963 4 Sheets-Sheet 3

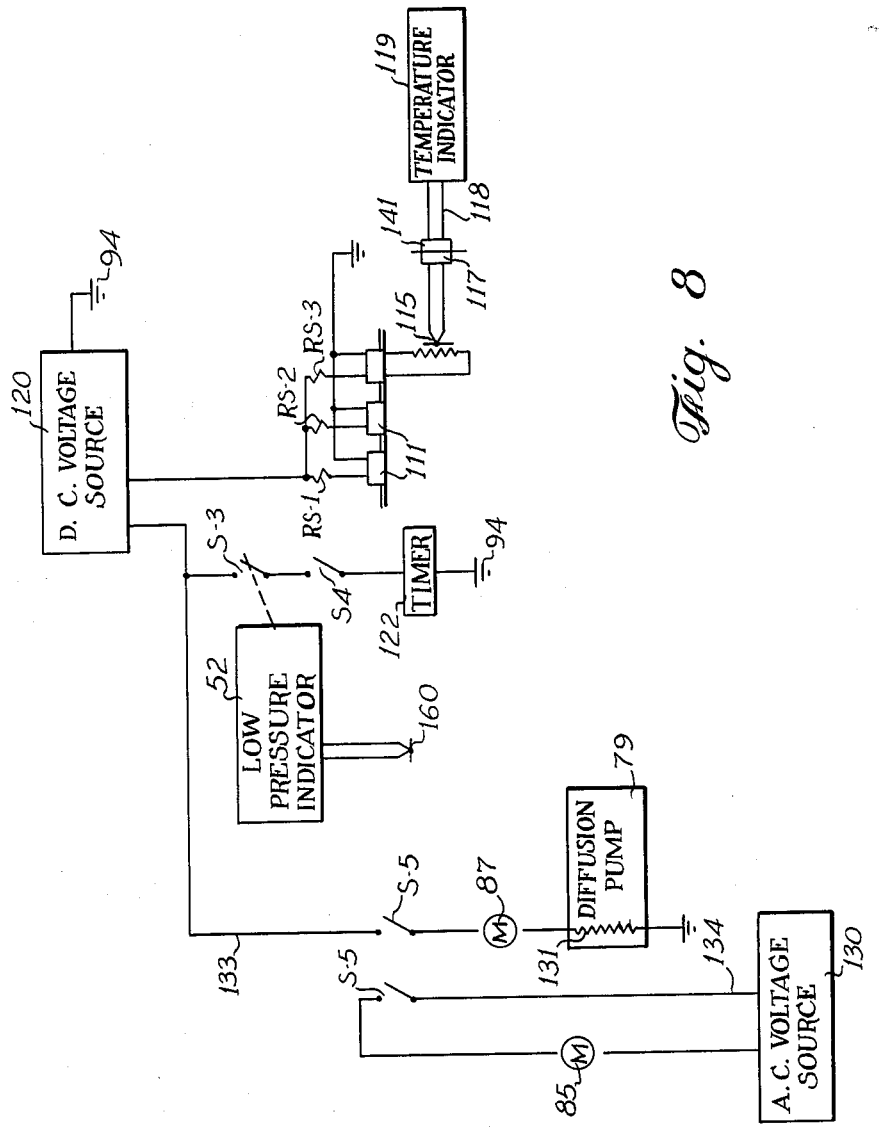

United States Patent Office 3,262,319
Patented July 26, 1966

3,262,319
METHOD AND APPARATUS FOR OBTAINING DATA FOR DETERMINING SURFACE AREA AND PORE VOLUME
Clyde Orr, Jr., Atlanta, and Warren P. Hendrix, Lawrenceville, Ga., assignors to Georgia Tech Research Institute, Atlanta, Ga., a corporation of Georgia
Filed May 10, 1963, Ser. No. 279,360
14 Claims. (Cl. 73—432)

This invention relates to instruments for the analysis of materials and more particularly to an instrument and method for the accurate determination of the specific surface area and the pore volume distribution of a catalyst, absorbent, or other powdered or porous material.

It is well known that the surface area of porous or powdered materials such as catalysts, absorbents, pharmaceuticals, rocket fuel components, carbon blacks, ceramics, metals, clays, or nuclear fuels can be evaluated by determining the quantity of a gas such as nitrogen which is necessary to form a monolayer on the surface of the material being examined. This is best accomplished with a gas such as nitrogen gas at the saturation temperature and pressure of the gas because under these circumstances the molecules of gas can be assumed to form a uniform, tightly packed monolayer. Moreover, the space occupied by each gas molecule is known within reasonable limits under these conditions.

In addition, it is well known that the pore volume distribution or the distribution of pores of various sizes in porous or powdered materials can be established by analysis of the conditions under which the pores or void spaces due to microscopic cracks and crevices within these materials fill with adsorbed gases and are freed of such gases. Since it is frequently necessary for industrial and scientific purposes to establish the surface area or pore volume of powdered materials, various devices and arrangements of apparatus have been devised for evaluating surface area and pore volume distribution, in accordance with these known techniques. These previous devices or arrangements of apparatus have generally been cumbersome to use and difficult and expensive to manufacture. Moreover, they have almost universally failed to produce data which would permit the accurate establishing of the surface area or pore volume distribution of a porous or powdered material even though extremely accurate results can be obtained in accordance with the principles of the known techniques.

The invention described herein is an instrument and method which provides the data necessary for the precision determination of the surface area or the pore volume distribution for a porous or powdered material. However, the instrument is equally suited to determining these characteristics of a porous or powdered material when speed in obtaining the data rather than precision or accuracy of information is paramount.

The invention is an instrument and method which permits the precision determination of the quantity of a gas necessary to form a single layer of gas molecules upon the surface of a porous or powdered material. This determination provides the data necessary for the accurate evaluation of the surface area of a powdered or porous material in accordance with known techniques. The invention also permits the precision determination of the amount of a gas at saturation pressure adsorbed by a porous or powdered material and of the amount of the gas adsorbed by the material at pressures less than the saturation pressure. The resulting data permit the accurate evaluation of the volume of pores of various radii in the porous or powdered material in accordance with the known principle that as a gas desorbs from a porous or powdered material it will desorb more readily from the larger pores than from the smaller ones. Thus, the amount of gas which has desorbed at each pressure less than that pressure necessary to saturate the material will be indicative of the volume of pores having a particular radius. The invention permits the pressure to be reduced below that necessary to saturate the material in a plurality of steps so that the data necessary to plot a plurality of points for a pore volume distribution are obtained.

The invention provides these and other improvements in the analysis of porous and powdered materials by providing a manifold through which a sample of material can be selectively placed in communication with means for removing all impurities from the sample or with any one of a plurality of gases under pressure and temperature conditions which permit the volume of a gas adsorbed by the sample of material to be accurately determined. The invention permits the accurate evaluation of surface area and pore volume distribution by providing a sample of material free of impurities and at a known temperature and by providing for the controlled adsorption and desorption of a gas under known conditions of temperature and pressure. The data obtained using the invention permits the accurate computation of surface area or pore volume distribution to be easily, accurately, and conveniently accomplished.

These and other features and advantages of the invention will be more clearly understood from the following detailed description and the accompanying drawings in which like characters of reference designate corresponding parts in all figures and in which:

FIG. 8 is a schematic wiring diagram for the invention.

These figures and the following detailed description disclose preferred specific embodiment of the invention, but the invention is not limited to the details disclosed since it may be embodied in other equivalent forms.

This invention is best understood as comprising a manifold 10 to which the material to be evaluated for surface area or pore volume distribution is connected and having means for removing all impurities from the sample and means for the controlled adsorption by and evaporation from the material of a gas such as nitrogen under conditions which permit the adsorption and evaporation of the gas to be determined with a high degree of accuracy so as to permit the accurate computation of the surface area or pore volume distribution in accordance with known techniques. The manifold 10 is formed by the interiors of a plurality of valves 11 and of a plurality of tube segments 12 joining the valves 11. In the specific embodiment of the invention described herein there are seven valves 11 joined by six tube segments 12.

Figure 1:
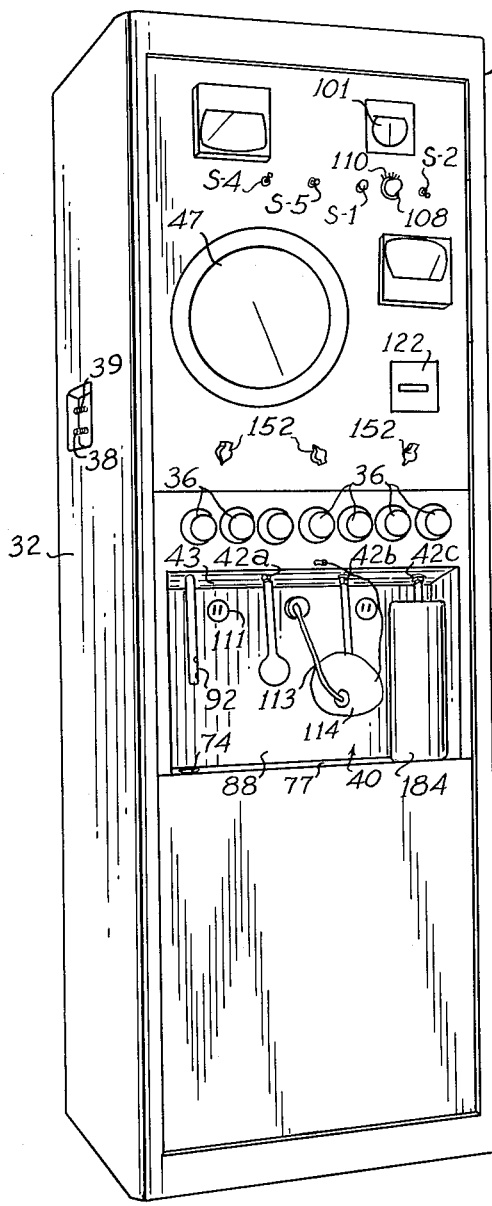
FIG. 1 is a perspective view of the instrument showing the arrangement of the various gages, controls, and switches and the recess within which samples are placed for analysis.
Figure 2:
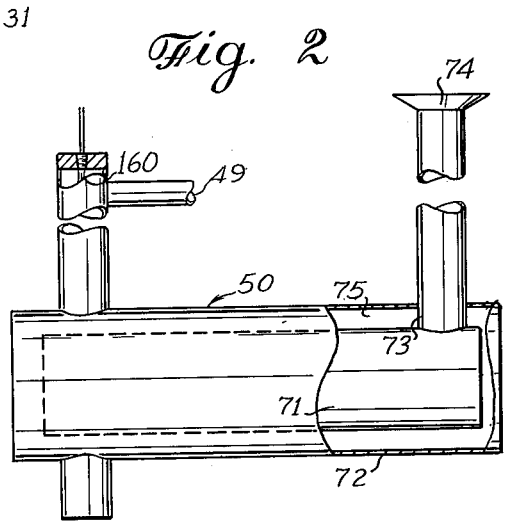
FIG. 2 is a side elevational view, partially in section, of the cold trap used in the evacuation portion of the instrument.
Figure 3:
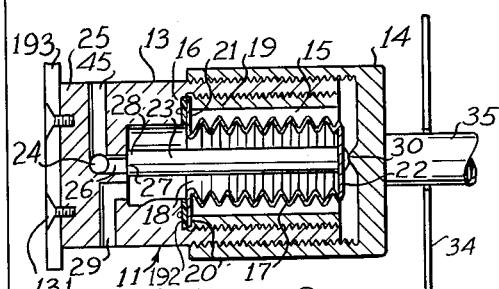
FIG. 3 is a sectional view of a valve taken in the center line of the valve.
Figure 4:
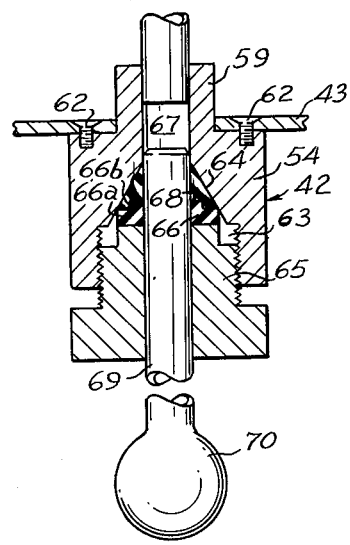
FIG. 4 is a sectional view of a sample fitting taken in the centerline of the sample fitting and showing a sample tube in elevation.
Figure 5:
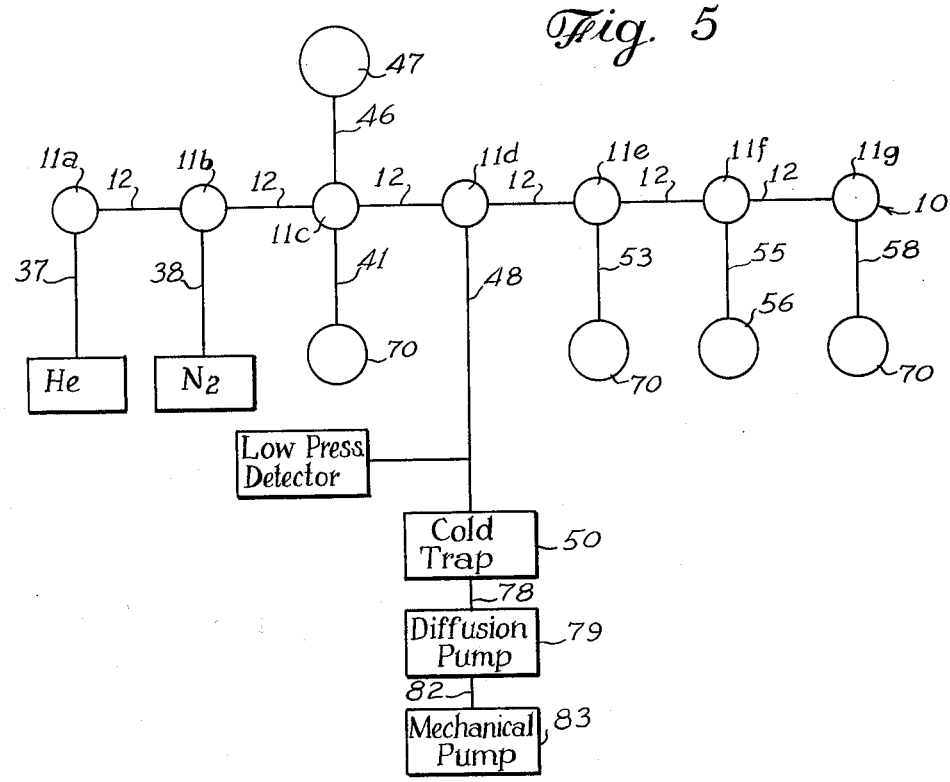
FIG. 5 is a schematic presentation of the instrument.

Each of the seven valves 11 is of the bellows type shown in cross section in FIG. 3 and each valve 11 has a body portion 13 and a cap portion 14. The body portion 13 of each valve 11 is cylindrical and has a first cylindrical cavity extending into it from one end 15. Joining the first cylindrical cavity of each valve 11 is a second cylindrical cavity having a smaller diameter but the same center line. A shoulder 16 is formed where the first cylindrical cavity is continuous with the second cylindrical cavity. A flange 21 at one end of a bellows 17 is concentric with and fixedly attached to the shoulder 16 and the interiors of the bellows 17 and of the second cylindrical cavity form a chamber 18. A gas-tight seal is insured where the bellows 17 joins the shoulder 16 by threading the interior of the first cylindrical cavity and threadably inserting a threaded sleeve 19 into the first cylindrical cavity until the lower edge 20 of the threaded sleeve 19 engages the flange 21 of the bellows 17 and forces a pliable ring 192 between the flange 21 and shoulder 16 against the shoulder 16.

The movable end of the bellows 17 remote from the flange 21 is a plate 22. A pin 23 extends from the interior surface of the plate 22 along the center line of the bellows 17 and into the second cylindrical cavity. A transverse passage 24 extends through the second end 25 of the body portion 13 of the valve 11. The center line of the transverse passage 24 is perpendicular to the center line of the pin 23 and a connector passage 26 extends between the transverse passage 24 and a port 27 opening into the second cylindrical cavity. The port 27 is closed by the extending end 28 of the pin 23 when the bellows 17 is partially collapsed. An access passage 29 from the second cylindrical cavity extends through the side of the body portion 13 of each valve 11 and when the port 27 is open this access passage 29 and the transverse passage 24 are joined through the chamber 18 and the connector passage 26. When the port 27 is closed by the extending end 28 of the pin 23, the transverse passage 24 is isolated from the access passage 29 and the chamber 18.

The chamber 18 is gas-tight as are the tube segments 12 between the transverse passages 24 of the valves 11. Each valve 11 is joined to a tube segment 12 in a gas-tight manner using known techniques such as welding. The result of this valve 11 and tube segment 12 arrangement is that the transverse passages 24 of the plurality of valves 11 are continuous with the interiors of the plurality of tube segments 12. The continuous interior formed in this manner is closed at each end by closing in known manner the ends of the two transverse passages 24 to which a tube segment 12 is not connected and the resulting gas-tight interior is the interior of the manifold 10.

When the extending end 28 of the pin 23 in one of the plurality of valves 11 is moved away from a port 27, the interior of the manifold 10 is joined to the chamber 18 of the valve 11 and to the access passage 29 of the valve 11. Motion of a pin 23 toward and away from the port 27 of one of the plurality of valves 11 is obtained by engaging the plate 22 with a nub 30 extending from the inner surface of the cap portion 14. A cap portion 14 threads onto the threaded exterior surface of the body portion 13 of each valve 11. Rotation of the cap portion 14 in one direction will move the nub 30 toward the port 27 of the body portion 13 of the valve 11 so as to press the plate 22 and pin 23 toward the port 27 and rotation of the cap portion 14 in the opposite direction will move the nub 30 away from the port 27 of the body portion 14 so as to permit the resiliency of the bellows 17 to move the pin 23 away from the port 27.

In the specific embodiment of the invention described herein, the plurality of valves 11 with tube segments 12 extending between them are mounted within a cabinet 31. The manifold 10 is formed by the valves 11 and tube segments 12 is horizontally positioned in the cabinet 31 by attaching the body portion 13 of each valve 11 with screws 131 to a mounting plate 193 extending horizontally between the left 32 and the right side 33 of the cabinet 31. Each valve 11 is between the mounting plate 193 and the front panel 34 of the cabinet 31 and a shaft 35 extends from the cap portion 14 of each valve 11 through the front panel 34 of the cabinet 31. A knob 36 is fixedly positioned on the extending end of each shaft 35 and rotation of a knob 36 will rotate the cap portion 14 of a valve 11 and open and close the port 27 of the valve 11. Thus, the manifold 10 can be joined to any one of the plurality of access passages 29 by simply rotating one or more of the knobs 36.

The access passage 29 of the first valve 11a is connected by tubing 372 to a helium port 38 located in the left side 32 of the cabinet 31. The access passage 29 of the second valve 11b is connected by tubing 37b to a nitrogen port 39 located above the helium port 38 in the left side 32 of the cabinet 31. The front panel 34 of the cabinet 31 has a rectangular recess 40 and the access passage 29 of the third valve 11c is connected by tubing 41 to sample fitting 42a fixedly inserted through a top panel 43 above the rectangular recess 40. This third valve 11c has a pressure passage 45 joining its transverse passage 24 through tubing 46 to a pressure indicator 47. The pressure indicator 47 is of known manometer type and is mounted in the front panel 34 of the cabinet 31. Since the transverse passage 24 of the third valve 11c is a segment of the manifold 10, pressure passage 45 places the pressure indicator 47 in continuous communication with the manifold 10 regardless of the positions of the valves 11. The valves 11 other than the valve 11c do not have a pressure passage 45. The access passage 29 of the fifth valve 11e is connected by tubing 53 to a second sample fitting 42b fixedly inserted through the top panel 43 and the access passage 29 of the sixth valve 11f is connected by tubing 55 to an extra volume flask 56. The extra volume flask 56 is a hollow container fixedly mounted within the cabinet 31 by a bracket 57 attached to the back side of the front panel 34. The access passage 29 of the seventh valve 11g is connected by tubing 58 to a third sample fitting 42c fixedly inserted through the top panel 43.

The three sample fittings 42a, 42b and 42c are identical and each sample fitting 42 has an upper portion 54 below the top panel 43 and with a stem 59 inserted through the top panel 43. It is to the stem 59 that the tubing 41, 53 or 58 is attached. The sample fitting 42 is fixedly positioned through the top panel 43 by inserting screws 62 through the top panel 43 and into the upper portion 54 of the sample fitting 42. A cylinder recess 63 extends into the lower end of the sample fitting 42 and a conical recess 64 is continuous with the cylindrical recess 63. The interior surface of the cylindrical recess 63 is threaded and a threaded plug 65 is threadably inserted into the cylindrical recess 63.

Above the plug 65 is a disc element 66 having a large disc 66a adjacent to the plug 65 and a smaller disc 66b above and concentric with the large disc 66a. Above the disc element 66 is a conical element 68 which has a contour substantially identical to the contour of the conical recess 64 and a base recessed to enclose the smaller disc 66b. The conical element 68 and the disc element 66 are of relatively pliable material such as a non-porous plastic and a tube passage 67 extends through the stem 59, the conical element 68, the disc element 66 an the plug 65.

A sample flask 69 having a cylindrical portion open at one end and with a bulb 70 at its other end is inserted into a sample fitting 42 by sliding the cylindrical portion of the sample flask 69 into the tube passage 67 until the upper end of the cylindrical portion is above the conical element 68. With the sample flask 69 in this position, the plug 65 is rotated so as to move the plug 65 upward in the cylindrical recess 63 and force the disc element 66 and conical element 68 upward. This upward motion of the conical element 68 causes the conical recess 64 to squeeze the conical element 68 inward toward the sample flask 69. The squeezing motion of the conical element 68 makes a gas-tight seal between the conical element 68 and the conical recess 64 and between the conical element 68 and the sample flask 69. A gas-tight seal is further insured by the squeezing of the disc element 66 against the sample flask 69 resulting from the smaller disc 66b being enclosed by the conical element 68. When it is desired to remove a sample flask 69, it is simply necessary to rotate the plug 65 in the opposite direction so as to move the plug 65 downward and away from the disc element 66 and the conical element 68 and release the sample flask 69.

The material to be evaluated for surface area or pore volume distribution is placed in the bulb 70 of a sample flask 69 and the plurality of sample fittings 42 permit a plurality of sample flasks 69 to be joined simultaneously in a gas-tight manner to the manifold 10. Each sample flask 69 has a sample of material in its bulb 70 and although only one sample of material is evaluated at a time, the plurality of sample fittings 42 permits the evaluation of material samples in sequence to be efficiently accomplished.

The cold trap 50 comprises a cylindrical inner shell 71 with a polished outer surface enclosed within a cylindrical outer shell 72 with a polished inner surface. The axis of the inner shell 71 coincides with the axis of the outer shell 72 and the inner shell 71 is fixedly positioned within the outer shell 72 by extending a hollow post 73 from the inner shell 71 through the outer shell 72. The post 73 is of low thermal conductive material such as stainless steel, is of minimum wall thickness, and is fixedly attached to inner shell 71 by welding or other known method. That portion of the post 73 passing through the outer shell 72 is fixedly joined to the outer shell 72 by welding or other known method.

The end of the post 73 extending beyond the outer shell 72 is continuous with a funnel member 74 and the interior of the post 73 is continuous with the interior of the inner shell 71. The funnel member 74 and the post 73 provide a convenient means for filling the interior of the inner shell 71 with a cooling material such as liquid nitrogen.

The diameter and length of the inner shell 71 is substantially less than the diameter and length of the outer shell 72 and a cooling chamber 75 is formed between the inner shell 71 and the outer shell 72. The interior of the input post 49 to which the access passage 29 of the valve lid is connected by tubing 48 is continuous with this cooling chamber 75 and an exit post 76 extends from the cooling chamber 75. A gas passing into the access passage 29 of the valve lid will pass into the cooling chamber 75 through the input post 49, will be cooled in the cooling chamber 75 by the material within the inner shell 71 and will pass from the cold trap 50 through the exit post 76.

The cold trap 50 is fixedly positioned within the cabinet 31 by suspending the cold trap 50 by a strap 141 from the underside of the deck 77 of the rectangular recess 40 in the front panel 34. The post 73 is of sufficient length for the funnel member 74 to pass through the deck 77. This places the upper edge of the funnel member 74 in the rectangular recess 40 and permits cooling material to be conveniently placed in the cold trap 50 from outside the cabinet 31.

The exit post 76 of the cold trap 50 is connected by tubing 78 to the suction side of a diffusion pump 79. The diffusion pump 79 is of known type having cooling fins 80 and containing oil which is heated by a heating element 131. The diffusion pump 79 is mounted in the cabinet 31 below the cold trap 50 by extending a bracket 81 between the diffusion pump 79 and the back of the front panel 34 of the cabinet 31. The discharge side of the diffusion pump 79 is connected by tubing 82 to the suction side of a mechanical pump 83 of known type. The mechanical pump 83 is mounted within the cabinet 31 by welding it to the floor 84 of the cabinet 31. The mechanical pump 83 is driven by an electrical motor 85 fixedly mounted on the floor 84 of the cabinet 31. The mechanical pump 83 and motor 85 are joined by a belt 86 in known manner.

The motor 85 is connected in a conventional manner to any convenient source of alternating current voltage 130 through a switch S-5. The S-5 is a three position switch and is mounted in the front panel 34 of the cabinet. In its first position, the switch S-5 connects the motor 85 to the voltage source 130 and places the heating element 131 of the diffusion pump 79 in series between a source of direct current voltage 120 and ground 94. The flow of current through the motor 85 causes the mechanical pump 83 to operate and the flow of current through the heating element of the diffusion pump 79 causes the oil in the diffusion pump to evaporate so as to be condensed in known manner and aid in creating a vacuum.

In its second position, the switch S-5 opens the circuit 133 between the heating element 131 and the voltage source 120 but leaves the circuit 134 closed between the motor 85 and the voltage source 130. In its third position, the switch S-5 opens both the circuit 133 and the circuit 134.

The three positions of the switch S-5 permit the mechanical pump 83 to be operated without heating of the oil in the diffusion pump 79 until the pressure above the oil has been reduced to a point at which the oil will readily evaporate. If the oil is heated prior to this point, it will tend to boil and become charred and otherwise damaged. However, once this pressure is reached, the heating of the oil in the diffusion pump 79 and the operation of the mechanical pump 83 resulting from placing the switch S-5 in its first position in combination with the cold trap 50 permits a near perfect vacuum to be obtained.

A blower 87 is fixedly positioned within the cabinet 31 adjacent to the diffusion pump 79. The blower 87 is in the same circuit 133 with the heating element 131 of the diffusion pump 79 and the discharge of the blower 87 is directed over the fins 80 of the diffusion pump 79 and used to cool the diffusion pump 79 in known manner so as to aid the condensing of the oil in the diffusion pump 79. A shelf 90 extends between the back panel 88 of the rectangular recess 40 and the back cover 89 of the cabinet 31. The shelf 90 separates the manifold 10 in the upper portion of the cabinet 31 from the electric motor 85, mechanical pump 83, blower 87 and other components in the lower portion of the cabinet 31 and with the left side 32, the right side 33, front panel 34, and back cover 89 of the cabinet 31 serves to provide the manifold 10 with a uniform temperature environment. Drafts of air and heat from components such as the electric motor 85 are eliminated and will not affect the evaluation of surface area or pore volume distribution by the invention. Thus, the shelf 90 and the placing of the manifold 10 above the shelf 90 contribute significantly to the accuracy of the invention.

A thermistor 91 of known type is attached to the tube segment 12 between the fifth valve 11e and the sixth valve 11f. This thermistor 91 changes its resistance in known manner in response to the temperature of the tube segment 12 and the response of the thermister 91 will indicate the temperature of a gas in the manifold 10. A probe 92 extends from the top panel 43 into the rectangular recess 40 and within the probe 92 is a second thermistor 93. The probe 92 is easily inserted into a container such as a container of liquid nitrogen and the response of the thermistor 93 will be indicative of the temperature of the material into which the probe 92 is inserted.

Figure 6:
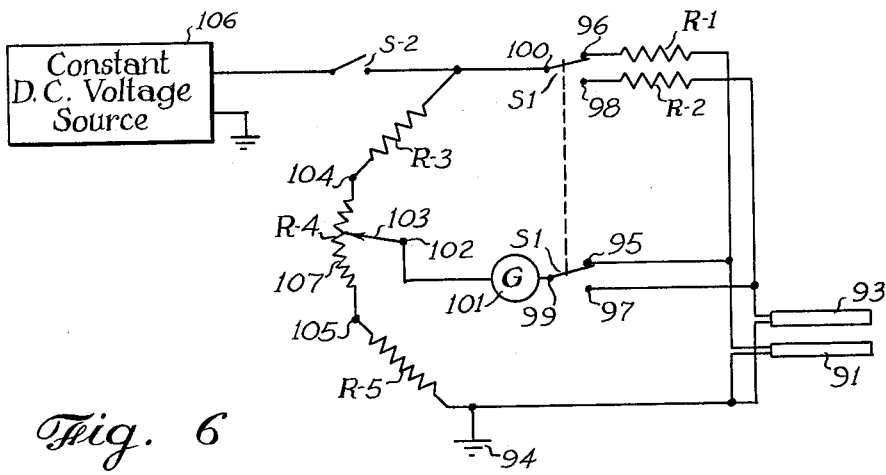
FIG. 6 is a schematic presentation of an embodiment of the temperature indicating portion of the invention.
Figure 7:
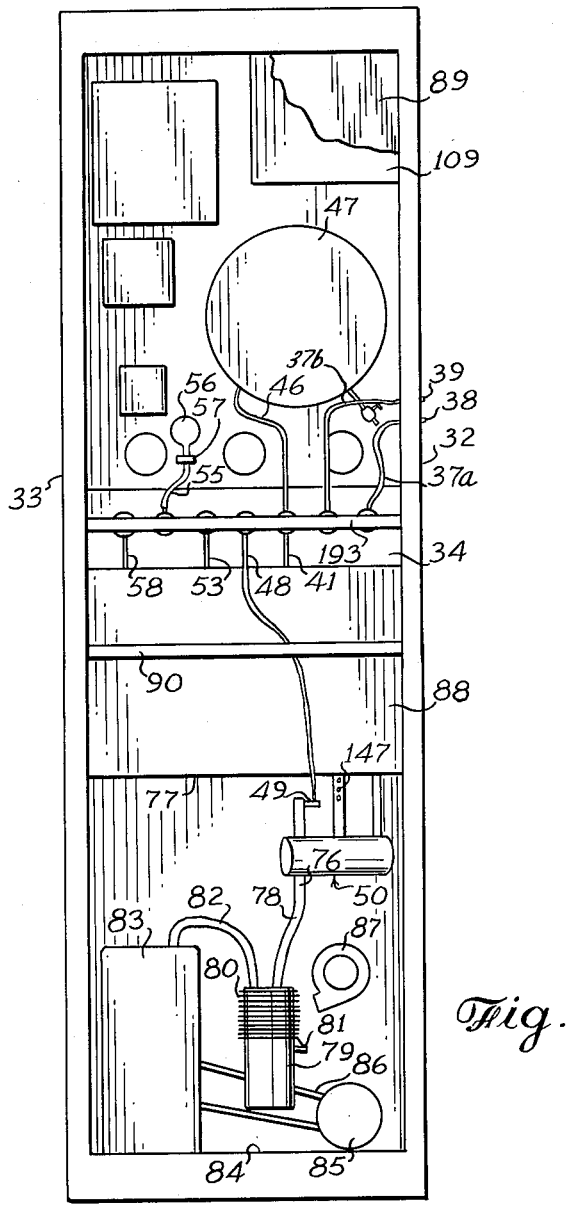
FIG. 7 is a back elevational view of the instrument with the majority of the back cover of the instrument cut away in order to show the interior arrangement of the various components of the instrument.
Figure 9:
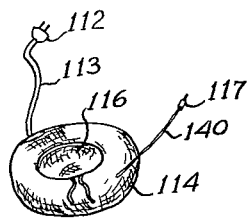
FIG. 9 is a sectional view of a heating jacket.

The thermistor 91 and thermistor 93 are components of the precision temperature indicating portion of the invention shown schematically in FIGURE 6. The thermistor 91 is connected in parallel between ground 94 and the terminal 95 of a switch S-1 and between ground 94 and the terminal 96 of the switch S-1 through a resistance R-1. Similarly, the thermistor 93 is connected in parallel between ground 94 and the terminal 97 of the switch S-1 and between ground 94 and the terminal 98 of the switch S-1 through a resistance R-2. The switch S-1 is of the double-throw type well known in the art and in its first and normal position the switch S-1 connects the terminal 95 to a terminal 99 and the terminal 96 to a terminal 100. In its second or depressed position, the switch S-1 connects the terminal 97 to the terminal 99 and the terminal 98 to the terminal 100.

The terminal 99 of switch S-1 is connected through a galvanometer 101 of conventional type, well known in the art to the terminal 102 of the contactor 103 of a slide-wire type resistor. The terminal 100 of the switch S-1 is connected in series through a resistance R-3, to one terminal 104 of the slide wire R-4 of the slide-wire type resistor. The other terminal 105 of the slide wire R-4 is connected to ground 94 through a resistance R-5. A source of direct current voltage 106 is connected to the terminal 100 of the switch S-1.

When the switch S-1 is in its first and normal position, the thermistor 91 and the resistance R-1 are in series and in parallel between the voltage source 106 and ground 94 with the resistance R-3, the slide-wire R-4 and the resistance R-5 in series. The galvanometer 101 is connected between the contactor 103 and a point between the resistance R-1 and the thermistor 91. In accordance with conventional bridge circuit theory, the galvanometer 101 will not deflect when the voltage drop through the resistance R-5 and that portion 107 of the slide wire R-4 on the same side of the contactor 103 as the resistance R-5 is equal to the voltage drop through the thermistor 91. The voltage drop through the resistance R-5 and the portion 107 of the slide wire R-4 is adjusted by changing the resistance of the portion 107 of the slide wire R-4. The resistance of the portion 107 of the slide wire R-4 is changed by changing the position of the contactor 103 point along the length of the slide wire between terminals 104 and 105.

The contactor 103 is an arm which is pivoted along the length of the slide wire R-4 by a knob 108 and rotating the knob 108 will bring the galvanometer to zero deflection. The slide wire type resistor is mounted in a box 109 attached to the back of the front panel 34 of the cabinet 31 and the knob 108 is in front of the front panel 34. The galvanometer 101 is mounted in the front panel 34 above the knob 108 and the switch S-1 is mounted to the left of the knob 108 in the front panel 34. A switch S-2 is mounted in the front panel 34 to the right of the knob 108. The switch S-2 has on and off positions and energizes the temperature indicating portion of the invention only when it is in its on position.

Mounted in the front panel 34 between the knob 108 and the front panel 34 is a scale 110 and the rotational position of the knob 108 is indicated by the scale in known manner. When the switch S-2 is placed in its on position and with the switch S-2 in its normal position, the thermistor 91 is responding to the temperature of the manifold 10 and the adjustment of the knob 108 in order to return the galvanometer 101 to zero deflection is indicative of the temperature of the manifold 10. The particular temperature indicated by each adjustment of the knob 108 is empirically determined in known manner and as a result the temperature of the manifold 10 can be determined with a high degree of accuracy.

When the switch S-1 is depressed, the thermistor 93 replaces the thermistor 91 and the resistance R-2 replaces the resistance R-1 in the manner already indicated above and the response of the galvanometer 101 and the knob 108 rotation required to return the galvanometer to zero deflection will be indicative of the temperature to which the thermistor 93 is responding. Thus, when the switch S-1 is depressed the temperature indicating portion of the invention will indicate the temperature of the material in which the probe 92 is inserted rather than the temperature of the manifold 10.

The probe 92 is used to obtain the temperature of very cold materials such as liquid nitrogen and the manifold 10 is generally at or near room temperature. As a result, the resistance R-1 and resistance R-2 are selected in known manner to adjust the response of the galvanometer 101 to the different temperature ranges to which the thermistor 91 and the thermistor 93 are exposed. The fact that the switch S-1 must be held in depressed position prevents the thermistor 93 from being accidentally connected to and damaging the galvanometer 101 when the probe 92 is not in a material such as liquid nitrogen. However, regardless of whether the thermistor 93 or the thermistor 91 is in the circuit with the galvanometer 101, the rotation of the knob 108 necessary to return the galvanometer 101 to zero deflection is indicative of the temperature of a thermistor 91 or 93 and the significance of knob 108 rotation in terms of temperature can be empirically established in known manner. Thus, the temperature indicating portion of the invention permits the temperature of the manifold 10 to be determined whenever the switch S-2 is in on position and permits the temperature of any low temperature material to easily be determined by simply depressing the switch S-1. When the switch S-1 is released, the invention will return to indicating manifold 10 temperature. With proper selection of the resistances R-1, R-3, R-4, and R-5, the scale 110 and the portion of the knob 108 along the scale 110 may be used to directly indicate temperatures.

Three jacks 111 are fixedly positioned in the back panel 88 of the rectangular recess 40. Each of these jacks 111 is connected in known manner by a lead 121 through a rheostat 151 to a conventional source of direct current voltage 120. The plug 112 at the end of a lead 113 from a heating jacket 114 is insertable into any one of the plurality of jacks 111. Each heating jacket 114 is shaped to receive within it the bulb 70 of a sample flask 69 and each heating jacket 114 is of known type in that heat is generated by the flow of current through the heating jacket 114. The current through a heating jacket 114 is adjusted by resistance of a rheostat 151 in known manner by turning a knob 152 mounted in the front panel 134. The heating jacket 114 has a thermocouple 115 fixedly embedded in its inner surface 116. The thermocouple 115 is at one end of a lead 140 having a plug 117 at its other end. The plug 117 is inserted into a jack 141 mounted in the front panel 34 above the rectangular recess 40. The jack 141 is connected by a lead 118 to a temperature gauge 119. The thermocouple 115 is of known type which causes a flow of current dependent in quantity upon the temperature to which the thermocouple 115 is exposed and the temperature gauge 119 is of known type which indicates temperature in response to current flow.

A low pressure detector 52 of known type having a thermocouple 160 responsive to the pressure in the cold trap 50 and having a switch S-3 which closes when a particular pre-set pressure is reached is mounted in the front panel 34. Since pressure variations in a liquid nitrogen atmosphere are accurately reflected by comparable temperature variations the thermocouple is preferable to conventional pressure responsive means of the diaphragm type. The thermocouple 160 is fixedly positioned in the post 49 of the cold trap and switch S-3 is in series between a source of direct current voltage 120 and ground 94 with a timer 122. The timer 122 is of a known resettable type which, when reset, will record the time lapse in minutes during which current flows through the timer 122. A switch S-4 is between the timer 122 and the switch S-3. This switch S-4 is mounted in the front panel 34 of the cabinet 31 adjacent to the low pressure indicator 52 and in its off position it will disconnect the timer 122 from the switch S-3 operated by the low pressure indicator 52.

*Operation*

When the invention is used to obtain data for the precision determination of the surface area of a porous or powdered material, an empty sample flask 69 and a stopper (not shown) are initially weighed to an accuracy of approximately .0001 gram. After the sample flask 69 has been weighed, a sample of the material to be evaluated is placed within the sample flask 69 and the sample flask 69 is inserted into the tube passage 67 of a sample fitting 42, as for example, sample fitting 42a. A gas tight seal is formed between the interior of the sample flask 69 and the tubing 41 and all valves 11 and placed in closed position using the knobs 36. The switch S-5 is placed in its second position with all valves 11 closed and with the switch S-5 in its second position, the mechanical pump 83 begins to evacuate all gases from that portion of the instrument between the valve 11d and the mechanical pump 83. The low pressure detector 52 is connected to this portion of the instrument and will soon indicate a pressure of approximately 100 microns of mercury. When this pressure is reached, the switch S-5 is placed in its first position. This causes heating of oil in the diffusion pump 79 and continues the mechanical pump 83.

The combined operation of the mechanical pump 83 and the diffusion pump 79 soon causes a vacuum of five microns of mercury or less to be achieved between the mechanical pump 83 and valve 11d. When this degree of vacuum is achieved, the valve 11d is opened to place the interior of the manifold 10 in communication with the mechanical pump 83. Soon after the valve 11d is opened, the pressure indicator 47 indicates an essentially complete vacuum within the manifold 10.

Evacuation of the sample flask 69 now proceeds by slowly opening the valve 11c and connecting the sample fitting 42a and the sample of material to the manifold 10. After the valve 11c is fully open, the sample of material becomes completely freed of contaminating gases, water vapor and similar materials. The process is assisted by placing a heating jacket 114 around the sample flask 69. The heat of the heating jacket 114 as controlled by a rheostat 115 combined with the pumping action of the mechanical pump 83 and the diffusion pump 79 results in all contaminating gas, water vapor and the like being removed from the sample of material.

It has been found that a temperature of at least 110° centigrade is necessary to drive off unbounded water from most samples of material and temperatures of as much as 150 to 200° centigrade are recommended unless the sample of material being tested is thermatically unstable. The temperature at which the sample is being heated is indicated by the temperature gauge 119.

After all contaminating gases, water vapor and similar materials have been removed from the sample of material, the valve 11d is closed, isolating the manifold 10 from the mechanical pump 83 portion of the instrument. The valve 11b is opened, causing nitrogen gas to enter the manifold 10 through the tubing 38 from any convenient source of nitrogen (not shown) attached in known manner to the nitrogen port 39. The nitrogen gas is permitted to enter the manifold 10 until a pressure of about 800 millimeters of mercury is indicated on the pressure indicator 47. When this pressure is obtained in the manifold 10, the valve 11b is closed, discontinuing the flow of nitrogen gas into the manifold 10. The sample of material is now removed from the sample fitting 42a and the stopper (not shown) is placed in the end of the sample flask 69. The stopper and the nitrogen gas, now at atmospheric pressure, prevent air or other contaminating material from entering the sample flask 69. The stopper, sample flask 69 and the enclosed sample of material with the entrapped nitrogen gas is weighed to .0001 gram accuracy. The weight of the nitrogen gas is negligible or easily determined and this second weighing will give the precise weight of the sample of material.

After this second weighing of the sample of material, the sample flask 69 is reattached to the sample fitting 42a and the valves 11c and 11d are again opened. The heating jacket 114 is again placed around the sample flask 69 and the rheostat 115 is set by the knob 152 to heat the sample of material at 250° centigrade or higher. The construction of the apparatus readily permits such heating temperatures and the higher the temperature, the more rapidly and completely the sample of material will be freed of surface contaminants. This second heating step must be more energetic than the previous heating step because it is now necessary to remove from the sample of material not only gases and vapors which might contribute significantly to sample weight, but as much as possible of all gas molecules attached to the surface of the sample.

At this stage in the operation of the instrument, the cold trap 50 is filled with liquid nitrogen and the low pressure detector 52 is set in known manner to close the switch S-3 when a vacuum of approximately one micron of mercury has been reached. The switch S-4 is placed in on position and the mechanical pump 83 and diffusion pump 79 are operated until the timer 122 indicates that a vacuum of one micron of mercury has been maintained in the manifold 10 and in the sample flask 69 for at least thirty minutes. This degree of vacuum for a sustained period of time as indicated by the timer 122 in combination with the heating by the heating jacket 114 will result in the effective removal of all impurities from the surface of the sample of material.

After the sample has been exposed to a vacuum of one micron or less for a sufficient period of time as indicated by the timer 122, heating of the sample of material is discontinued and the heating jacket 114 is removed from the sample flask 69. At this point, the switch S-2 is closed and the thermistor 93 is placed in a flask of liquid nitrogen 184 placed in the rectangular recess 40 beneath the probe 92. With the probe 92 immersed in the liquid nitrogen in the flask 184, the switch S-1 is depressed and the temperature of the liquid nitrogen determined by adjusting the knob 108 until the galvanometer 101 deflection is zero.

The flask 184 of liquid nitrogen at known temperature is now placed about the sample flask 69 and the valve 11d is closed to isolate the manifold 10 from the mechanical pump 83 portion of the instrument. The valve 11a is opened to place the manifold 10 in communication with a container of helium gas (not shown) connected in known manner to the helium port 38 in the left side 32 of the cabinet 31. Helium gas is permitted to enter the manifold 10 until a pressure of approximately 350 millimeters of mercury is obtained as shown by the pressure indicator 47. When this pressure is reached, the valve 11a is closed, and after allowing a moment for equilibrium to be established throughout the manifold 10, the pressure indicator 47 indicates the pressure of the helium gas within the manifold 10 and the thermistor 91 causes the galvanometer 101 to indicate the temperature of the manifold 10.

After this temperature and pressure is recorded, the valve 11c is opened to permit the helium gas to flow from the manifold 10 into the sample flask 69 and when sufficient time has elapsed for equilibrium to be again achieved, the temperature and pressure of the helium gas in the manifold 10 and the sample flask 69 is read and recorded in the same manner as the temperature and pressure of the helium gas in the manifold 10 was initially read and recorded.

The helium gas which enters the sample flask 69 is not appreciably adsorbed by the sample of material even at liquid nitrogen temperatures, and it merely fills the space in and about the porous or powder sample of material. Therefore, these data permit the volume of the space in the sample flask 69 not filled by the sample of material to be determined. After this step, the valve 11d is again opened to connect the manifold 10 to the mechanical pump 83 and the liquid nitrogen flask 184 is removed from about the sample flask 69. Next, the heating jacket 114 is placed around the sample flask 69 and the sample of material is heated and subjected to the action of the mechanical pump 83, diffusion pump 79 and cold trap 50 for about fifteen minutes. This results in the removal of all helium gas from the sample of material and from the manifold 10.

After this removal of all helium gas from the sample of material, the valve 11c is closed to isolate the sample of material from the manifold 10, the heating jacket 114 is removed from the sample flask 69 and the sample of material is allowed to cool for a few minutes. After this cooling is accomplished, the sample flask 69 is once again inserted into the flask 184 of liquid nitrogen, the valve 11d is closed to isolate the manifold 10 from the mechanical pump 83 portion of the instrument, and the valve 11b is opened to introduce nitrogen gas into the manifold 10 in the manner previously described. The nitrogen gas is permitted to enter the manifold 10 until a pressure of approximately 200 millimeters of mercury is indicated on the pressure indicator 47, at which time the valve 11b is closed. After allowing a few moments for equilibrium to be established within the manifold 10, the pressure of the nitrogen gas in the manifold 10 is read on the pressure indicator 47 and the temperature of the nitrogen gas in the manifold 10 is read by adjusting the knob 108 for zero galvanometer 101 deflection.

After the foregoing step has been completed, the valve 11c is opened to connect the sample flask 69 to the manifold 10. This causes the nitrogen gas in the manifold 10 to flow into the sample flask 69 where some of it will be adsorbed on the surface of the sample of material. After waiting approximately 15 minutes for equilibrium to be again established, the pressure of the gas as shown on the pressure indicator is again recorded and the temperature of the manifold 10 is again obtained by adjusting the knob 108.

The last obtained pressure is less than a hundred millimeters of mercury and the foregoing steps of admitting nitrogen gas into the manifold 10 with valve 11c closed, of discontinuing the admission of nitrogen gas, of opening the valve 11c, and of determining the temperature and pressure before and after the nitrogen gas is admitted to the sample flask 69 are repeated until the final pressure when the nitrogen gas is admitted to the sample flask 69 is at least 100 millimeters of mercury. This will generally take two to five admissions of nitrogen gas into the manifold 10 and from the manifold 10 into the sample flask 69. The more steps taken, the more reliable the determination of the surface area of the sample. However, where speed rather than precision is essential in determining the surface area of the sample of material, the pressure of 100 millimeters of mercury can often be achieved with one step by proper selection of the amount of nitrogen gas initially introduced into the manifold 10.

With very high surface area materials, it is very difficult to admit sufficient quantities of nitrogen gas into the sample flask 69 as rapidly as desirable for the most efficient operation of the instrument even if the gas pressure in the manifold 10 prior to each opening of the valve 11c is increased to as high as 700 or 800 millimeters of mercury. In order to place more nitrogen gas within the manifold 10 for adsorption by high surface area materials with each introduction of nitrogen gas into the manifold 10 through the valve 11b, the extra volume flask 56 is provided. When the valve 11f is opened, the extra volume flask 56 is placed in communication with the manifold 10 and the extra volume flask 56 receives a sufficient amount of additional nitrogen gas each time valve 11b is opened to provide the quantity of nitrogen gas necessary for efficient adsorption by the sample of material. Thus, the extra volume flask 56 substantially speeds the operation of the instrument.

The volume of the manifold 10 is known and after a gas pressure of 100 millimeters of mercury has been achieved in the desired number of steps as described above, the recorded pressures and the volumes of gas adsorbed by the sample of material computed in known manner permit the surface area of the sample of material to be evaluated in known manner.

The obtaining with the invention of the data necessary for the evaluation of the pore volume distribution of a porous or powdered material is a continuation of the method outlined above for obtaining the data necessary for evaluating the surface area of a porous or powdered sample. However, the repeated steps of admitting nitrogen gas into the manifold 10 and of subsequently releasing the gas into the sample flask 69 are continued until the pressure in the manifold 10 and sample flask 69 reaches that pressure which is the saturation pressure for the material. After the saturation pressure of the material is reached, the pressure in the manifold 10 and the sample flask 69 is reduced progressively by repeatedly removing the nitrogen gas from the manifold 10 using the mechanical pump 83 and with the valve 11c closed and then opening the valve 11c to permit the gas to pass into the manifold 10 from the sample flask 69 and with the valve 11d closed. This two step procedure is repeated a number of times until the pressure in the manifold 10 after the valve 11c is opened does not exceed 150 millimeters of mercury. Each time this de-gassing procedure is repeated the pressure and temperature before and after the valve 11c is opened and before the valve 11d is opened are determined in the manner described above. The pressures recorded and the volumes computed in known manner permit the pore volume distribution of the sample material to be evaluated in known manner.

It will be obvious to those skilled in the art that many variations may be made in the embodiments here chosen for the purpose of illustrating the present invention, without departing from the scope thereof as defined by the appended claims.

What is claimed as invention is:

1. An instrument for obtaining the data necessary to compute the surface area and the pore volume distribution of a sample of porous material in a sample flask, said instrument comprising, in combination, a cabinet having a right side, a left side, a floor, and a front panel with a recess defined at the top by a top panel and at the bottom by a deck; a plurality of sample fittings fixedly extending through the top panel of the recess, each sample fitting having means for connecting its interior to the interior of the sample flask; a cold trap mounted to the front panel between the sides, said cold trap having an outer cylinder with a polished interior surface, a liquid input post with low thermal conductivity and extending between and through the deck of the recess in the front panel of the cabinet and through the outer cylinder, a gas entry post fixedly attached to the outer cylinder and with its interior continuous with the interior of the outer cylinder, a gas exit post fixedly attached to the outer cylinder and with its interior continuous with the interior of the outer cylinder, and an inner cylinder with a polished exterior surface spaced apart from the interior surface of the outer cylinder and having its interior continuous with the interior of the liquid input post; extra volume flask fixedly mounted to the front panel between the sides and having an interior of known volume; a plurality of valves, each of said valves having a transverse passage, a gas-tight chamber, a connector passage extending between the transverse passage and the gas-tight chamber, and an access passage opening into the gas-tight chamber, the first of said valves having its access passage connected to a helium port in the left side of the cabinet, the second of said valves having its access passage connected to a nitrogen port in the left side of the cabinet, the third of said valves having its access passage connected to the interior of one of the plurality of sample fittings, the fourth of said valves having its access passage connected to the gas input post of the cold trap, the fifth of said valves having its access passage connected to the interior of the second of the plurality of sample fittings, the sixth of said valves having its access passage connected to the interior of the extra volume flask, and the seventh of said valves having its access passage connected to the interior of the third of the plurality of sample fittings, and all of said valves being mounted on a bracket extending between the left side and the right side of the cabinet above the top panel of the recess in the front panel of the cabinet; a plurality of tubes extending between the plurality of valves, the interiors of said tubes and the transverse passage of said valves forming a manifold; means mounted in the front panel for selectively closing the connector passages in the plurality of valves; a pressure detector mounted in the front panel of the cabinet above the said top panel, said pressure detector being operatively connected to the transverse passage of the third of the plurality of valves, a mechanical pump mounted on the floor of the cabinet and having a suction inlet, a diffusion pump connected between the gas exit post of the cold trap and the suction inlet of the mechanical pump and having a heating element; a thermocouple positioned in the gas inlet post of the cold trap; means mounted in the front panel of the cabinet responsive to the flow of current from the thermocouple for indicating the gas pressure in the cold trap, said means having a switch which closes when a particular gas pressure is indicated; timing means mounted in the front panel of the cabinet responsive to the closing of the said switch; means mounted in the front panel of the cabinet for indicating the temperature of the said manifold; switch means for operating the mechanical pump and causing current to flow through the heating element of the diffusion pump.

2. An instrument for obtaining the data necessary to compute the surface area and the pore volume distribution of a sample of porous material in a sample flask, said instrument comprising, in combination, a cabinet having a back, a right side, a left side, a floor, and a front panel with a recess defined at the top by a top panel and at the bottom by a deck; a sample fitting extending through the top panel of the recess, said sample fitting having means for connecting its interior to the interior of the sample flask; a horizontal partition extending between the recess and the back of the cabinet; a cold trap mounted on the front panel below the partition, said cold trap having an outer cylinder with an interior surface, a liquid input post extending between and through the deck of the recess in the front panel of the cabinet and through the outer cylinder, a gas entry post fixedly attached to the outer cylinder and with its interior continuous with the interior of the outer cylinder, a gas exit post fixedly attached to the outer cylinder and with its interior continuous with the interior of the outer cylinder, and an inner cylinder with an exterior surface spaced apart from the interior surface of the outer cylinder and having its interior continuous with the interior of the liquid input post; an extra volume flask fixedly mounted to the front panel above the partition and having an interior of known volume; a plurality of valves, each of said valves having a transverse passage, a gas-tight chamber, a connector passage extending between the transverse passage and the gas-tight chamber, and an access passage opening into the gas-tight chamber, the first of said valves having its access passage connected to a first gas port in the left side of the cabinet, the second of said valves having its access passage connected to a second gas port in the left side of the cabinet, the third of said valves having its access passage connected to the interior of the sample fitting, the fourth of said valves having its access passage connected to the gas input post of the cold trap, the fifth of said valves having its access passage connected to the interior of the extra volume flask, and all of said valves being mounted between the left side and the right side of the cabinet above the partition; a plurality off tubes extending between the plurality of valves, the interiors of said tubes and the transverse passages of said valves forming a manifold enclosed within the front panel, back, and sides of the cabinet and the partition; means for selectively closing the connector passages in the plurality of valves; a pressure detector mounted in the front panel of the cabinet, said pressure detector being operatively connected to the transverse passage of the third of the plurality of valves; a mechanical pump mounted on the floor of the cabinet and having a suction inlet, a diffusion pump connected between the gas exit post of the cold trap and the suction inlet of the mechanical pump and having a heating element; a thermocouple positioned in the gas inlet post of the cold trap; means mounted in the front panel of the cabinet responsive to the flow of current from the thermocouple for indicating the gas pressure in the cold trap, said means having a switch which closes when a specific gas pressure is reached; timing means mounted in the front panel of the cabinet responsive to the closing of the said switch; means mounted in the front panel of the cabinet for indicating the temperature of the said manifold, means for selectively operating the mechanical pump and causing current to pass through the heating element of the cold trap; and means for indicating the temperature of the sample of material in the sample flask.

3. An instrument for obtaining the data necessary to compute the surface area of a sample of porous material in the interior of a sample flask, said instrument comprising, in combination, a mounting means; sample fitting mounted on the mounting means and having means for connecting its interior to the interior of the sample flask; a cold trap mounted on the mounting means and having a gas input port and a gas exit port; a plurality of valves mounted on the mounting means, each of said valves having a transverse passage, a chamber, a connector passage extending between the transverse passage and the chamber, and an access passage opening into the chamber, the first of said valves having its access passage connected to a first gas port in the mounting means, the second of said valves having its access passage connected to a second gas port in the mounting means, the third of said valves having its access passage connected to the interior of the sample fitting, and the fourth of said valves having its access passage connected to the gas input port of the cold trap; a plurality of tubes extending between the plurality of valves, the interiors of said tubes and the transverse passages of said valves forming a manifold; means for selectively closing the connector passages in the plurality of valves; a pressure detector mounted on the mounting means, said pressure detector being operatively connected to the transverse passage of the third of the plurality of valves; a mechanical pump mounted on the mounting means and having a suction inlet; a diffusion pump on the mounting means and connected between the gas exit post of the cold trap and the suction inlet of the mechanical pump and having a heating element; a thermocouple positioned in the gas inlet port of the cold trap; means mounted on the mounting means and responsive to the flow of current from the thermocouple for indicating the pressure in the cold trap, said means having a switch which closes when a specific gas pressure is reached; timing means mounted on the mounting means and responsive to the closing of the said switch; means mounted on the mounting means for indicating the temperature of the said manifold; adjustable heating means for heating the sample of material in the sample flask; means mounted on the mounting means for indicating the temperature of said heating means; and means for selectively operating the mechanical pump and heating the heating element of the diffusion pump.

4. An instrument for obtaining the data necessary to compute the pore volume distribution for a sample of material in the interior of a sample flask, said instrument comprising, in combination, a manifold with a gas-tight interior, means for selectively connecting and disconnecting the interior of the sample flask to the interior of the manifold, extra volume means, means selectively connecting and disconnecting the extra volume means to the interior of the manifold, means for admitting controlled amounts of a gas into the interior of the manifold, means for removing all gas from the interior of the manifold, means for indicating gas pressure in the manifold, means for indicating the temperature of a gas in the manifold, means for the controlled heating of the sample of material, and means for cooling the sample of material.

5. An instrument for obtaining the data necessary to compute the pore volume distribution for a sample of material in the interior of a sample flask, said instrument comprising, in combination, a manifold with a gas-tight interior; means for selectively connecting and disconnecting the interior of the sample flask to the interior of the manifold; means for admitting controlled amounts of a gas into the interior of the manifold; means for indicating gas presssure in the manifold, means for indicating the temperature of a gas in the manifold; means for the controlled heating of the sample of material, means for cooling the sample of material; and degassing means for removing all gas from the sample of material, said degassing means having a cold trap as a part thereof and said cold trap having an outer cylinder with a polished interior surface and an interior continuous with the remainder of the degassing means, a liquid input post with low thermal conductively and extending through the outer cylinder, and an inner cylinder with a polished exterior surface spaced apart from the interior surface of the outer cylinder and having its interior continuous with the interior of the liquid input post.

6. An instrument for obtaining the data necessary to compute the surface area and pore volume distribution for a sample of material in the interior of a sample flask, said instrument comprising, in combination, a manifold with a gas-tight interior; a sample fitting having a stem with a passage, a threaded cylindrical recess in its lower end, a conical recess continuous with the cylindrical recess and tapering to join the passage in the stem, a plug with a passage threadably inserted in the cylindrical recess, a pliable ring with a circular shoulder and a passage continuous with the passage in the plug, a conical insert of pliable material filling the conical recess and seated on and around the shoulder of the pliable ring and with a passage joining the passage of the pliable ring to the passage of the stem, and all of said passages in the sample fitting with a diameter which permits the insertion of the sample flask when the plug is rotated downward; means for selectively connecting and disconnecting the passage of said stem to the interior of the manifold; means for admitting controlled amounts of a gas into the interior of the manifold; means for removing all gas from the interior of the manifold; means for indicating gas pressure in the manifold; means for indicating the temperature of a gas in the manifold; means for the controlled heating of the sample of material; and means for cooling the sample of material.

7. An instrument for obtaining the data necessary to compute the surface area and pore volume distribution for a sample of material in the interior of a sample flask, said instrument comprising, in combination, a manifold with a gas-tight interior; a valve having a body portion with a chamber, a transverse passage continuous with the manifold, a connector passage joining the chamber and transverse passage, and an access passage joining the chamber to the interior of the simple flask, having a bellows continuous with the chamber, having a pin movable with the bellows to open and close the connector passage, and having means for selectively moving the bellows and pin; means for admitting controlled amounts of a gas into the interior of the manifold; means for removing all gas from the interior of the manifold; means for indicating gas pressure in the manifold; means for indicating the temperature of a gas in the manifold; means for the controlled heating of the sample of material; and means for cooling the sample of material.

8. An instrument for obtaining the data necessary to compute the surface area and pore volume distribution for a sample of material in the interior of a sample flask, said instrument comprising, in combination, a manifold with a gas-tight interior; means for selectively connecting and disconnecting the interior of the sample flask to the interior of the manifold; means for admitting controlled amounts of a gas into the interior of the manifold; means for removing all gas from the interior of the manifold; means for indicating gas pressure in the manifold; a temperature indicator having a thermistor responsive to the temperature of the manifold, a first resistor, connecting means connecting the first resistor to the thermistor, a second resistor, a third resistor, a slide wire resistor with a contactor and with its slide wire between the second resistor and the third resistor, a galvanometer with one side connected to the contactor of the slide wire resistor and its other side connected to the said connecting means, a voltage source, means for placing the thermistor and first resistor in parallel between the voltage source and ground with the second resistor, the slide wire, and the third resistor, rotatable means for moving the contactor of the slide wire resistor until the galvanometer does not deflect, and means responsive to the rotatable means for indicating the temperature to which the thermistor is responding means for the controlled heating of the sample of material; and means for cooling the sample of material.

9. A method of determining for a sample of porous material the plurality of pressures and the sample weight and volume required for computing by known techniques the surface area of the sample of porous material, comprising, in combination, the steps of placing the sample of material in a container, weighing the container and the sample of material and removing all vapors and gases from the surface of the material and from the container, filling the container containing the sample of material with nitrogen gas, weighing the container and the sample of material with the nitrogen gas in the container, heating the container and the sample of material and removing all gas molecules from the surface of the sample of material and from the container, cooling the sample of material in the container to the saturation temperature at atmospheric pressure of nitrogen gas, ascertaining the temperature and pressure of a known volume of helium gas, allowing the known volume of helium gas to expand to the extent necessary to fill that portion of the container not occupied by the sample of material, ascertaining the temperature and pressure of the helium gas in the known volume and the container with the sample of material still at the saturation temperature at atmospheric pressure of nitrogen gas, heating the container and the sample of material and removing all helium gas from the sample of material and from the container, cooling the sample of material to the saturation temperature at atmospheric pressure of liquid nitrogen, ascertaining the temperature and pressure of an initial known volume of nitrogen gas at less than the saturation pressure for that temperature, allowing the nitrogen gas to expand until it is in equilibrium throughout its initial known volume and the container while keeping the sample of material at the temperature of liquid nitrogen at atmospheric pressure, ascertaining the temperature and pressure of the nitrogen gas in the initial known volume and the container, adding nitrogen gas to the initial known volume of nitrogen gas only, ascertaining the new temperature and pressure of the initial known volume of nitrogen gas at less than the saturation pressure for that temperature, allowing the nitrogen gas to again expand until it is in equilibrium throughout its initial known volume and the container while keeping the sample of material at the temperature of liquid nitrogen at atmospheric pressure, ascertaining the temperature and pressure of the nitrogen gas, and repeating the four immediately previous steps until the gas pressure in the initial volume and the container equals that gas pressure at which the gas forms a monolayer on the porous surface of the sample of material.

10. A method of determining for a sample of porous material the plurality of pressures and the sample weight and volume required for computing by known techniques the pore volume distribution of the sample of a porous material, comprising, in combination, the steps of placing the sample of material in a container, weighing the container and the sample of material, heating the container and the sample of material and removing all vapors and gases from the surface of the material and from the container, filling the container containing the sample of material with nitrogen gas, weighing the container and the sample of material with the nitrogen gas in the container, heating the container and the sample of material and removing all gas molecules from the surface of the sample of material and from the container, cooling the sample of material in the container to the saturation temperature at atmospheric pressure of nitrogen gas, ascertaining the temperature and pressure of a known volume of helium gas, allowing the known volume of helium gas to expand to the extent necessary to fill that portion of the container not occupied by the sample of material, ascertaining the temperature and pressure of the helium gas in the known volume and the container with the sample of material still at the saturation temperature at atmospheric pressure of liquid nitrogen, heating the container and the sample of material and removing all helium gas from the sample of material and from the container, cooling the sample of material to the saturation temperature at atmospheric pressure of liquid nitrogen, ascertaining the temperature and pressure of an initial known volume of nitrogen gas at less than the saturation pressure for that temperature, allowing the nitrogen gas to expand until it is in equilibrium throughout its initial known volume and the container while keeping the sample of material at the temperature of liquid nitrogen at atmospheric pressure, ascertaining the temperature and pressure of the nitrogen gas in the initial known volume and the container, adding nitrogen gas to the initial known volume of nitrogen gas only, ascertaining the new temperature and pressure of the initial known volume of nitrogen gas at less than the saturation pressure for that temperature, allowing the nitrogen gas to again expand until it is in equilibrium throughout its initial known volume and the container while keeping the sample of material at the temperature of liquid nitrogen at atmospheric pressure, ascertaining the temperature and pressure of the nitrogen gas, repeating the four immediately previous steps until the gas pressure in the initial volume and the container equals the saturation pressure of nitrogen at the ascertained temperature, removing a portion of the nitrogen gas from the initial volume, releasing nitrogen gas from the container into the initial volume, ascertaining the temperature and pressure of the nitrogen gas in the initial volume and the container, and repeating the two immediately previous steps until a pressure substantially equal to that gas pressure at which the gas forms a monolayer is reached.

11. A method of determining the plurality of pressures required for computing by known techniques the surface area of a sample of porous material, said sample of material having a known volume and weight and the said method comprising, in combination, the steps of heating the sample of material and removing all gas and impurities from the sample of material, cooling the sample of material to the saturation temperature at atmospheric pressure of liquid nitrogen, ascertaining the temperature and pressure of an initial known volume of nitrogen gas at less than the saturation pressure for the ascertained temperature, allowing the nitrogen gas to expand until it is in equilibrium throughout its initial known volume and the sample of material at the temperature of liquid nitrogen at atmospheric pressure, ascertaining the temperature and pressure of the nitrogen gas in the initial known volume and the sample of material, adding nitrogen gas to the initial known volume of nitrogen gas only, ascertaining the new temperature and pressure of the initial known volume of nitrogen gas at less than the saturation pressure for the ascertained temperature, allowing the nitrogen gas to again expand until it is in equilibrium throughout its initial known volume and the sample of material at the temperature of liquid nitrogen at atmospheric pressure, ascertaining the temperature and pressure of the nitrogen gas, and repeating the four immediately previous steps until the gas pressure in the initial volume and the sample of material equals that gas pressure at which the gas forms a monolayer on the porous surface of the sample of material.

12. A method of determining for a sample of porous material the plurality of pressures required for computing by known techniques the pore volume distribution of the sample of a porous material, said sample having a known weight and volume and said method comprising, in combination, the steps of heating the sample of material and removing all gas and other impurities from the sample of material, cooling the sample of material to the saturation temperature at atmospheric pressure of liquid nitrogen, ascertaining the temperature and pressure of an initial known volume of nitrogen gas at less than the saturation pressure for that temperature, allowing the nitrogen gas to expand until it is in equilibrium throughout its initial known volume and the sample of material at the temperature of liquid nitrogen at atmospheric pressure, ascertaining the temperature and pressure of the nitrogen gas in the initial known volume and the sample of material, adding nitrogen gas to the initial known volume of nitrogen gas only, ascertaining the new temperature and pressure of the initial known volume of nitrogen gas at less than the saturation pressure for that temperature, allowing the nitrogen gas to again expand until it is equilibrium throughout its initial known volume and the sample of material at the temperature of liquid nitrogen at atmospheric pressure, ascertaining the temperature and pressure of the nitrogen gas, repeating the four immediately previous steps until the gas pressure in the initial volume and the sample of material equals the saturation pressure of nitrogen at the temperature ascertained, removing a portion of the nitrogen gas from the initial volume, releasing nitrogen gas from the sample of material into the initial volume, ascertaining the temperature and pressure of the nitrogen gas in the initial volume and the sample of material, and repeating the two immediately previous steps until a pressure substantially equal to that gas pressure at which the gas forms a monolayer is reached.

13. A method of determining for a sample of porous material the plurality of pressures and the sample weight and volume required for computing by known techniques the surface area of the sample of porous material, comprising, in combination, the steps of placing the sample of material in a container, weighing the container and the sample of material, heating the container and the sample of material and removing all vapors and gases from the surface of material and from the container, filling the container containing the sample of material with a pure dry gas, weighing the container and the sample of material with the pure dry gas in the container, heating the container and the sample of material and removing all gas molecules from the surface of the sample of material and from the container, cooling the sample of material in the container to the saturation temperature at atmospheric pressure of said pure dry gas adsorbed by the sample of material, ascertaining the temperature and pressure of a known volume of said pure dry gas not adsorbed by the material, allowing the known volume of the said non-adsorbed gas to expand to the extent necessary to fill that portion of the container not occupied by the sample of material, ascertaining the temperature and pressure of the said non-adsorbed gas in the known volume and the container with the sample of material still at the saturation temperature at atmospheric pressure of the said adsorbed gas, heating the container and the sample of material and removing all of said non-adsorbed gas from the sample of material and from the container, cooling the sample of material to the saturation temperature at atmospheric pressure of the said adsorbed gas, ascertaining the temperature and pressure of an initial known volume of the said adsorbed gas at less than the saturation pressure for that temperature, allowing the said adsorbed gas to expand until it is in equilibrium throughout its initial known volume and the container while keeping the sample of material at the saturation temperature of the said adsorbed gas at atmospheric pressure, ascertaining the temperature and pressure of the said adsorbed gas in the initial known volume and the container, adding an additional quantity of the said adsorbed gas to the initial known volume of the said adsorbed gas, ascertaining the new temperature and pressure of the initial known volume of the said adsorbed gas at less than the saturation pressure for that temperature, allowing the said adsorbed gas to again expand until it is in equilibrium throughout its initial known volume and the container while keeping the sample of material at the saturation temperature of the said adsorbed gas at atmospheric pressure, ascertaining the temperature and pressure of the said adsorbed gas, and repeating the four immediately previous steps until the gas pressure in the initial volume and the container equals that gas pressure at which said adsorbed gas forms a monolayer on the porous surface of the sample of material.

14. A method of determining for a sample of porous material the plurality of pressures and the sample weight and volume required for computing by known techniques the pore volume distribution of the sample of a porous material, comprising, in combination, the steps of placing the sample of material in a container, weighing the container and the sample of material, heating the container and the sample of material and removing all vapors and gases from the surface of the material and from the container, filling the container containing the sample of material with a pure dry gas, weighing the container and the sample of material with the pure dry gas in the container, heating the container and the sample of material and removing all gas molecules from the surface of the sample of material and from the container, cooling the sample of material in the container to the saturation temperature at atmospheric pressure of said pure dry gas adsorbed by the sample of material ascertaining the temperature and pressure of a known volume of said pure dry gas not adsorbed by the material, allowing the known volume of the said non-adsorbed gas to expand to the extent necessary to fill that portion of the container not occupied by the sample of material, ascertaining the temperature and pressure of the said non-adsorbed gas in the known volume and the container with the sample of material still at the saturation temperaure at amospheric pressure of the said adsorbed gas, heating the container and the sample of material and removing all of the said non-adsorbed gas from the sample of material and from the container, cooling the sample of material to the saturation temperature at atmospheric pressure of the said adsorbed gas, ascertaining the temperature and pressure of an initial known volume of the said adsorbed gas at less than the saturation pressure for that temperature, allowing the said adsorbed gas to expand until it is in equilibrium throughout its initial known volume and the container while keeping the sample of material at the saturation temperature of the said adsorbed gas at atmospheric pressure, ascertaining the temperature and pressure of the said adsorbed gas in the initial known volume and the container, adding an additional quantity of the said adsorbed gas to the initial known volume of adsorbed gas only, ascertaining the new temperature and pressure of the initial known volume of the said adsorbed gas at less than the saturation pressure for that temperature, allowing the said adsorbed gas to again expand until it is in equilibrium throughout its initial known volume and the container while keeping the sample of material at the saturation temperature at atmospheric pressure of the said adsorbed gas, repeating the four immediately previous steps until the gas pressure in the initial volume and the container equals the saturation pressure of the said adsorbed gas at atmospheric pressure, removing a portion of the said adsorbed gas from the initial volume, releasing said adsorbed gas from the container into the initial volume, ascertaining the temperature and pressure of the said adsorbed gas in the initial volume and the container, and repeating the two immediately previous steps until a pressure substantially equal to that gas pressure at which the said adsorbed gas forms a monolayer is reached.

References Cited by the Examiner

UNITED STATES PATENTS

| | | | |
|---|---|---|---|
| 2,729,969 | 1/1956 | Innes | 73—432 |
| 2,960,870 | 11/1960 | Nelsen et al. | 73—432 |

DAVID SCHONBERG, *Primary Examiner.*

LOUIS R. PRINCE, *Examiner.*